Jan. 7, 1969 A. P. W. HADDON ET AL 3,420,425
INFORMATION STORAGE DEVICES
Filed Nov. 21, 1966
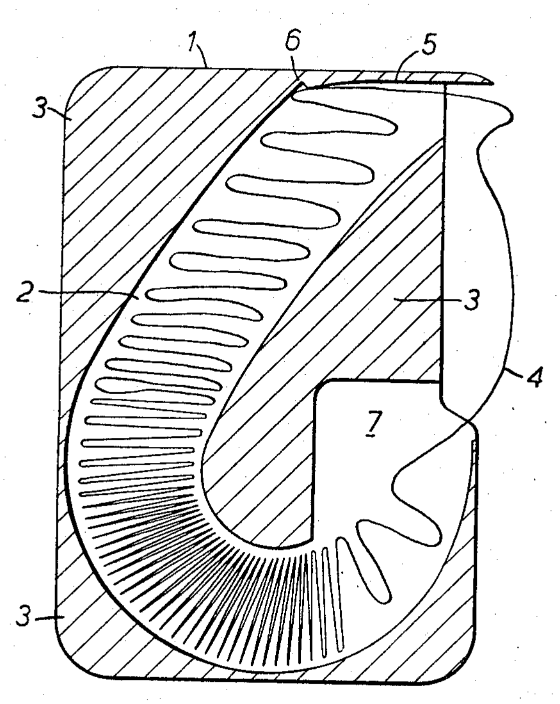

United States Patent Office 3,420,425

Patented Jan. 7, 1969

3,420,425

INFORMATION STORAGE DEVICES

Alistair Peter William Haddon, David T. Gwillim, and Thomas Edward Wood, Ilford, England, assignors to The Plessey Company Limited, Ilford, England, a British company Filed Nov. 21, 1966, Ser. No. 595,887
Claims priority, application Great Britain, Nov. 24, 1965, 50,005/65
U.S. Cl. 226—196 5 Claims
Int. Cl. B65h 23/10; G03b 1/48; B65h 17/42

ABSTRACT OF THE DISCLOSURE

An information storage device comprising a chamber adapted to accommodate an endless loop of information storage tape in contiguous folds wherein the folds are compressed in their passage through the chamber, the fold-compressing pressure being relieved at the points of entry and exit of the tape.

This invention relates to information storage devices.

In information storage equipment the information is frequently carried on flexible strip material which is transported across a gate or head to enable intelligence to be recorded onto or reproduced off the strip material. If the flexible strip material is a cinema film, for example, this may be passed continuously or intermittently through a film gate to enable light signals to be recorded or reproduced. The flexible strip material may alternatively be a magnetic tape which will be passed across recording or reproducing heads to enable a transfer of the information to take place. In the following specification and claims an information storage device will be described in which information is stored on magnetic tape, but it will be understood that the term magnetic tape is intended to cover any suitable flexible strip material such as cinema film or paper tape for the storage of information.

Magnetic tape is usually carried in information storage equipment upon tape reels supported on a tape deck. The tape reels may be heavy and consequently the engineering needed in the tape deck to control movement of the tape reels may make the deck an expensive piece of equipment. The tape is liable to pick up dirt in being transported from one reel to the other and generally some expensive air conditioning installation will be necessary to reduce dirt and to maintain the tape at the correct temperature and humidity conditions.

The present invention provides a method in which an endless loop of tape is carred within a closed cassette without the use of tape reels so that the inertia resisting changes of rate of movement of the tape may be kept to a particularly low value.

According to one feature of the invention an information storage device comprises a chamber adapted to accommodate between substantially parallel sides an endless loop of magnetic tape in contiguous folds of predetermined size, the passage of which is promoted through the chamber such that the tape may be withdrawn from one end of the chamber and pushed into an opposite end.

Preferably the action of gravity is used to promote the passage of the folded material through the chamber. The folds of tape may be compressed in their passage through the chamber but this pressure is relieved at the points of entry and exit to the chamber.

An area within the chamber adjacent the point of entry of the tape preferably includes means causing the entering tape to form into folds of a predetermined size. The means may include a wall of the chamber along which the tape is passed as it enters the chamber, the line of the wall abruptly changing its direction so as to cause the tape to be folded back on itself when it strikes against the wall at this point. Preferably the change of direction of the wall includes a concavity which facilitates the folding of the tape without restriction of the general flow of tape in the chamber.

The chamber may have two branches and a shape similar to that of a U-type but preferably is approximately of the form of an upper case letter G. The tape entering the chamber at the top of the G, being folded and then falling under the action of gravity to the bottom of the G from where the tape may be drawn out of the chamber. This arrangement together with the step of accommodating the tape in folds of predetermined size ensures that the tension required to withdraw the tape from the chamber remains substantially constant. This feature enables the tape to be passed over recording/reproducing head means outside the chamber so that writing or reading of information on the tape may be carried out at a substantially constant predetermined speed.

Brake means may be provided adjacent the exit to the chamber so that inertial forces will not cause the tape to continue to flow out of the chamber when the action of tape drive means outside the chamber is interrupted. The brake means may comprise a vacuum brake in which a vacuum applied to a perforated surface tends to hold the tape against this surface and thus create a frictional force tending to retard movement of the tape. This brake means is also conveniently used to control the tension of the driven length of tape during its motion over the recording/reproducing head means.

An area within the chamber adjacent the point of exit of the tape includes an opening area of comparatively large size which allows compressed loops of tape to be expanded so that any tight loops or bends in the tape may be released.

The coefficient of friction for the tape around the periphery of the letter G must be reduced as much as possible so as to permit free flow of the tape within the cassette form. A coating comprising a surface of exposed glass beads has been found to give low friction and low static drag. A convenient form in which this type of surface can be applied to the chamber is by the use of an adhesive material available under the name Camouflage Black Scotchlite Tape Type 234C from the Minnesota Mining and Manufacturing Company Limited, 3M House, Wigmore Street, London, W.1., England.

Within the chamber the tape must progness from being compressed in a small to a larger volume. This is achieved by tapering the chamber in a way that will be explained later so that the space required to accommodate the tape will be wider at the exit end of the G than at the entrance.

By way of example an embodiment of the invention will be further explained with reference to the drawing accompanying the specification which shows a side view of an information storage device in the form of a tape cassette which is intended to be used in conjunction with information transcribing equipment.

The tape cassette comprises a flat box 1 which is approximately of rectangular shape. The tape cassette described in this example is intended to operate with the tape passing through the cassette under the action of gravity and this rectangular box will thus be supported on one end in tape transcribing apparatus. The drawing thus represents an elevation of a tape cassette having transparent sides as it would appear in use.

The box 1 contains a tape chamber 2 which is defined within the area of the box by packing pieces 3. The tape chamber is in the shape approximately of an upper case letter G. In this example the box is about 18″ high and 13″ wide and is of sufficient depth to accommodate a length of tape one inch in width. The tape is in the form of an endless loop which is fed into the tape chamber 2 at the top of the letter G, becomes folded, compressed and stored within the curved part of the letter G and may be withdrawn from the lower extremity of the letter G, processed in tape transcription apparatus and passed back into the tape chamber near the top thereof.

When the tape re-enters the tape chamber 2 from the tape transcription apparatus it is moved roughly parallel to a side wall 5. At the end of this wall the tape strikes a re-entrant member 6 which causes the length of tape to be folded at predetermined intervals and the thus formed folds fall into the part of the tape chamber constituted by the curved portion of the letter G. The positioning of the re-entrant member 6 is such that the entering tape will be folded at intervals of about ½ inch to 2 inches. Folds of this size allow the tape to be stored compactly in the cassette and ensure that the forces required subsequently to pull the tape out of such folds need not be excessive. Thus although the tape is confined in the cassettee it remains free to be withdrawn. At the point where the tape enters the box 1 there is little force tending to compress the tape but as the folds of tape fall through the curved part of the Letter G the entering folds of tape falling upon them tend to cause compression of the lower folds and the portion of the loop of tape lying within the curved part of the letter G may thus be stored compactly enabling a useful length of the tape to be accomodated in a cassette of convenient size.

After the tape has passed through the curved part of the letter G it approaches an expansion chamber 7 where the loops of tape are allowed to expand and from where the tape can be drawn via an exit so that the tape can be passed across head means in tape transcription apparatus.

Since the tape is held in the cassette in the form of an endless loop the tape transcription apparatus may operate so as to drive the tape in one direction only so that the tape is fed only into the cassette at the upper entrance and withdrawn only from the lower exit.

The curved internal surfaces of the tape chamber 2 are coated with a surface of exposed glass beads so as to give low friction and low static drag to the tape 4. This type of surface is conveniently applied by use of an adhesive material available commercially under the name Camouflage Black Scotchlite Tape Type 234C from the Minnesota Mining and Manufacturing Company Limited.

The tape chamber 2 is tapered so that the one inch wide tape enters the chamber where the chamber is 1¹⁄₁₆ inches in depth and as the tape passes through the chamber the depth increases to 1⅛ inches. This tapering effect is achieved by making the box 1 deeper at its bottom than at its top.

The tape cassette of the invention has been found to be particularly suitable for use with thin and flexible grades of magnetic tape. One such tape is 3M (registered trade mark) Type 591 Computer Tape which is available from the Minnesota Mining and Manufacturing Company Limited. An alternative type that has been is Memorex Type 22L computor tape in a grade having a base 0.001 inch in thickness and a coating of 170 microinches thickness. This tape is available from Memorex Precision Products Limited, St. Ives House, St. Ives Road, Maidenhead, Berkshire, England.

In practice, when the tape cassette has been designed and constructed to meet a particular requirement it is found that for optimum performance the actual dimensions of the chamber can be critical. A deviation in only a fraction of an inch in certain measurements of a cassette can mean that its behaviour in operation may fall very short of the optimum.

Further features of the cassette are described in our co-pending British patent application No. 50,636/63.

The foregoing description of an embodiment of the invention has been given by way of example only and a number of modifications may be made without departing from the scope of the invention. For instance instead of the feed of the bulk of the tape through the cassette being by gravity other means might be used to move he volume of tape such as the action of differing air pressures.

What we claim is:

1. An information storage device comprising a chamber adapted to accommodate between substantially parallel sides thereof an endless loop of information storage tape in contiguous folds, said chamber having entry and exit openings facilitating the passage of the tape through the chamber wherein folds of tape are compressed in their passage through said chamber, means in said chamber for relieving the compressed pressure of the folds near said exit opening, and tape folding means for causing the tape entering the chamber to be formed into folds of predetermined size and including a wall along which the tape will pass, said wall including a point where there is a sharp change of direction in the line of the wall.

2. A device as claimed in claim 1 in which the sharp change of direction of the wall is effected by a concavity in the line of the wall.

3. A device as claimed in claim 1 in which the chamber comprises two branches where the tape can be at different heights such that there will be a tendency for the folded tape to flow from one branch where it is at a higher level into the other branch.

4. A device as claimed in claim 3 in which the chamber is in the form of a U-tube.

5. A device as claimed in claim 3 in which the chamber is similar in shape to that of an upper case letter G.

References Cited

UNITED STATES PATENTS

| | | | |
|---|---|---|---|
| 2,397,762 | 4/1946 | Steele | 226—118 |
| 2,521,440 | 9/1950 | Bannon | 226—118 X |
| 2,793,034 | 5/1957 | McKee | 226—118 X |
| 3,072,311 | 1/1963 | Cohen | 226—118 X |
| 3,243,978 | 4/1966 | Gowin | 226—118 |
| 3,355,166 | 11/1967 | Plumb | 226—95 X |

FOREIGN PATENTS

| | | |
|---|---|---|
| 877,211 | 9/1961 | Great Britain. |

ALLEN N. KNOWLES, *Primary Examiner.*

U.S. Cl. X.R.

226—119